(12) United States Patent
Tran et al.

(10) Patent No.: US 10,958,782 B2
(45) Date of Patent: *Mar. 23, 2021

(54) FACILITATING SOFTWARE DOWNLOADS TO INTERNET OF THINGS DEVICES VIA A CONSTRAINED NETWORK

(71) Applicant: AT&T Intellectual Property I, L.P., Atlanta, GA (US)

(72) Inventors: Lien Tran, Chatham, NJ (US); Simon Byers, Summit, NJ (US); Carlos Eduardo De Andrade, Highland Park, NJ (US); David Poole, Maplewood, NJ (US); Emir Halepovic, Somerset, NJ (US); Vijay Gopalakrishnan, Edison, NJ (US); Christopher Volinsky, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,277

(22) Filed: Jun. 7, 2019

(65) Prior Publication Data

US 2019/0312970 A1    Oct. 10, 2019

Related U.S. Application Data

(63) Continuation of application No. 15/446,797, filed on Mar. 1, 2017, now Pat. No. 10,362,166.

(51) Int. Cl.
*H04M 3/42* (2006.01)
*H04W 4/70* (2018.01)
(Continued)

(52) U.S. Cl.
CPC .... *H04M 3/42178* (2013.01); *H04L 65/1069* (2013.01); *H04L 65/80* (2013.01);
(Continued)

(58) Field of Classification Search
CPC ..... H04M 3/42178; H04W 4/44; H04W 4/70; H04W 8/00; H04W 8/245; H04W 76/00;
(Continued)

(56) References Cited

U.S. PATENT DOCUMENTS 6,069,871 A     5/2000   Sharma et al.
6,311,056 B1   10/2001   Sandidge
(Continued)

FOREIGN PATENT DOCUMENTS

CA    2 189 488 C    10/2000
CA    2 589 161 A1    6/2006
(Continued)

OTHER PUBLICATIONS

Google Scholar Search Results.*
(Continued)

*Primary Examiner* — Qun Shen
(74) *Attorney, Agent, or Firm* — Amin, Turocy & Watson, LLP

(57) ABSTRACT

Software downloads to Internet of things (IoT) devices are facilitated over a constrained network. In one embodiment a method comprises monitoring, by a network device comprising a processor, data determined to have been sent to a device for transmission to the device via a radio access network device of a wireless communication network, and determining, by the network device, a type of traffic associated with the data. The method further includes based on a determination that the data comprises firmware and that the type of traffic is of a traffic priority that is lower than a defined traffic priority, applying, by the network device, a low priority transport protocol to the data, wherein the applying comprises associating protocol information with the data representative of the low priority transport protocol.

20 Claims, 10 Drawing Sheets

(51) Int. Cl.
  *H04L 29/06* (2006.01)
  *H04L 29/08* (2006.01)
  *H04W 76/00* (2018.01)
  *H04W 4/44* (2018.01)
  *H04W 8/24* (2009.01)
  *H04W 8/00* (2009.01)

(52) U.S. Cl.
  CPC ............ *H04L 67/10* (2013.01); *H04L 67/12* (2013.01); *H04L 67/2819* (2013.01); *H04L 69/16* (2013.01); *H04W 4/44* (2018.02); *H04W 4/70* (2018.02); *H04W 8/00* (2013.01); *H04W 8/245* (2013.01); *H04W 76/00* (2013.01); *H04M 2207/18* (2013.01)

(58) Field of Classification Search
  CPC ..... H04L 65/1069; H04L 65/80; H04L 67/10; H04L 67/12; H04L 67/2819; H04L 69/16
  See application file for complete search history.

(56) References Cited

U.S. PATENT DOCUMENTS

| | | | |
|---|---|---|---|
| 6,424,624 B1 | 7/2002 | Galand et al. | |
| 6,657,962 B1 | 12/2003 | Barri et al. | |
| 6,988,182 B2 | 1/2006 | Teachman et al. | |
| 7,149,291 B1 | 12/2006 | Deshpande | |
| 7,478,381 B2 | 1/2009 | Roberts et al. | |
| 7,516,238 B2 | 4/2009 | Key et al. | |
| 7,574,706 B2 | 8/2009 | Meulemans et al. | |
| 7,577,981 B2 | 8/2009 | Clynes et al. | |
| 7,609,661 B2 | 10/2009 | Chae et al. | |
| 7,704,147 B2 | 4/2010 | Quraishi et al. | |
| 7,843,907 B1* | 11/2010 | Abou-Emara | H04L 49/3045 370/386 |
| 7,844,432 B1 | 11/2010 | Jones | |
| 7,890,427 B1 | 2/2011 | Rao et al. | |
| 8,311,858 B2 | 11/2012 | Everett et al. | |
| 8,320,302 B2 | 11/2012 | Richeson et al. | |
| 8,340,099 B2 | 12/2012 | Black et al. | |
| 8,578,361 B2 | 11/2013 | Cassapakis et al. | |
| 8,694,824 B2 | 4/2014 | Howard et al. | |
| 8,868,696 B2 | 10/2014 | Lewis et al. | |
| 8,881,243 B2 | 11/2014 | Magyar et al. | |
| 8,893,110 B2 | 11/2014 | Kapadekar et al. | |
| 8,910,139 B2 | 12/2014 | Li et al. | |
| 9,058,238 B2 | 6/2015 | Hironaka | |
| 9,405,528 B2 | 8/2016 | Osterloh et al. | |
| 9,444,569 B2 | 9/2016 | Vannithamby et al. | |
| 10,122,607 B2 | 11/2018 | Luna et al. | |
| 2002/0191637 A1 | 12/2002 | Lee et al. | |
| 2004/0064577 A1 | 4/2004 | Dahlin et al. | |
| 2005/0190755 A1* | 9/2005 | Singh | H04L 67/322 370/389 |
| 2006/0193287 A1 | 8/2006 | Ooshima et al. | |
| 2007/0015538 A1 | 1/2007 | Wang | |
| 2007/0169073 A1 | 7/2007 | O'Neill et al. | |
| 2007/0297375 A1 | 12/2007 | Bonta et al. | |
| 2008/0040777 A1* | 2/2008 | Aihara | H04L 12/2859 726/4 |
| 2008/0043625 A1 | 2/2008 | Cohen et al. | |
| 2008/0069138 A1 | 3/2008 | Acharya et al. | |
| 2010/0058421 A1 | 3/2010 | Hastings et al. | |
| 2011/0173598 A1 | 7/2011 | Cassapakis et al. | |
| 2011/0292800 A1* | 12/2011 | Flinta | H04L 47/10 370/235 |
| 2012/0106342 A1 | 5/2012 | Sundararajan et al. | |
| 2012/0120848 A1* | 5/2012 | Hegde | H04L 69/162 370/255 |
| 2012/0231777 A1* | 9/2012 | Lewis | G06F 8/65 455/418 |
| 2012/0233478 A1* | 9/2012 | Mucignat | H04L 61/2514 713/320 |
| 2012/0256009 A1 | 10/2012 | Mucignat et al. | |
| 2013/0201857 A1* | 8/2013 | Bhargava | H04W 72/02 370/252 |
| 2013/0308513 A1* | 11/2013 | Jheng | H04W 52/146 370/311 |
| 2014/0133296 A1* | 5/2014 | Johansson | H04W 72/1252 370/230 |
| 2015/0089080 A1 | 3/2015 | Alsup | |
| 2015/0304459 A1 | 10/2015 | Pakula et al. | |
| 2016/0072929 A1 | 3/2016 | Alsup | |
| 2016/0094464 A1* | 3/2016 | Talat | H04L 65/602 709/219 |
| 2016/0306620 A1 | 10/2016 | Mille et al. | |
| 2017/0099613 A1 | 4/2017 | Berggren et al. | |
| 2018/0067765 A1 | 3/2018 | Ra et al. | |
| 2019/0166057 A1 | 5/2019 | Gilson et al. | |
| 2020/0120407 A1 | 4/2020 | Boyd et al. | |

FOREIGN PATENT DOCUMENTS

| | | |
|---|---|---|
| CA | 2 646 146 A1 | 9/2007 |
| GB | 2 315 386 A | 1/1998 |
| KR | 2002-0034228 A | 5/2002 |
| WO | 00/17749 A1 | 3/2000 |
| WO | 2008/086231 A2 | 7/2008 |
| WO | 2016/171884 A1 | 10/2016 |

OTHER PUBLICATIONS

Goma et al., "SmartAP: Practical WLAN Backhaul Aggregation", IFIP Wireless Days (WD), 2013, 7 pages.
Bernardi et al., "Stix: A Goal-Oriented Distributed Management System for Large-Scale Broadband Wireless Access Networks", Proceedings of the 16th Annual International Conference on Mobile Computing and Networking, MobiCom, Sep. 20-24, 2010, 12 pages.
Davis, R.I., "Scheduling Slack Time in Fixed Priority Pre-emptive Systems", Proceedings Real-Time Systems Symposium, IEEE, 1993, 24 pages.
Lehoczky et al., "An Optimal Algorithm for Scheduling Soft-Aperiodic Tasks in Fixed-Priority Preemptive Systems", Proceedings Real-Time Systems Symposium, IEEE, 1992, pp. 110-123.
Jang et al., "Sustainable and Practical Firmware Upgrade for Wireless Access Point Using Password-Based Authentication", Sustainability, Aug. 31, 2016, pp. 1-17.
Tran et al., "Facilitation of Efficient Software Downloads for Vehicles", U.S. Appl. No. 15/193,685, filed Jun. 27, 2016, 80 pages.
Rossi et al., "LEDBAT: the new BitTorrent congestion control protocol", Proceedings of 19th International Conference on Computer Communications and Networks, Aug. 2-5, 2010, 6 pages.
Non-Final Office Action received for U.S. Appl. No. 15/446,797 dated May 9, 2018, 30 pages.
Final Office Action received for U.S. Appl. No. 15/446,797 dated Oct. 9, 2018, 25 pages.
Notice of Allowance received for U.S. Appl. No. 15/446,797 dated Mar. 8, 2019, 30 pages.
Kuzmanovic et al., "TCP-LP: Low-Priority Service via End-Point Congestion Control", IEEE/ACM Transactions on Networking (TON), vol. 14, No. 4, Aug. 2006, pp. 1-14.
Carofiglio et al., "A hands-on Assessment of Transport Protocols with Lower than Best Effort Priority", 35th IEEE Conference on Local Computer Networks, Oct. 11-14, 2010, 9 pages.
Winstein et al., "Stochastic Forecasts Achieve High Throughput and Low Delay over Cellular Networks", Proceedings of the 10th USENIX Symposium on Networked Systems Design and Implementation, Apr. 2-5, 2013, pp. 459-471.
Office Action for U.S. Appl. No. 16/385,782 dated Apr. 6, 2020, 18 pages.
Kouvatsos, Demetres, "Mobility Management and Quality-of-service for Heterogeneous Networks", published Apr. 14, 2009, River Publishers Series in Information Science and Technology, pp. 418-420 (Year 2009).

(56) References Cited

OTHER PUBLICATIONS

Office Action for U.S. Appl. No. 16/542,278 dated Feb. 10, 2021, 41 pages.

* cited by examiner

FACILITATING SOFTWARE DOWNLOADS TO INTERNET OF THINGS DEVICES VIA A CONSTRAINED NETWORK

RELATED APPLICATION

The subject patent application is a continuation of, and claims priority to, U.S. patent application Ser. No. 15/446,797, filed Mar. 1, 2017, and entitled "FACILITATING SOFTWARE DOWNLOADS TO INTERNET OF THINGS DEVICES VIA A CONSTRAINED NETWORK," the entirety of which application is hereby incorporated by reference herein.

TECHNICAL FIELD

The disclosed subject matter relates to facilitating software downloads to Internet of things (IoT) devices via a constrained network.

BACKGROUND

A boom in Internet of Things (IoT) is currently being witnessed. The term IoT refers to the concept of essentially connecting any device with an on and off switch to the Internet (and/or to each other). This includes everything from cell phones, coffee makers, washing machines, headphones, lamps, wearable devices, cars, and almost anything else of which one can think. This also applies to components of machines, for example, a jet engine of an airplane or the drill of an oil rig. It has been predicted by an analyst firm as one estimate that, by 2020, there will be over 26 billion connected IoT devices. Current trends indicate that IoT traffic volumes will dominate communication networks in the near future. One source of traffic volume is software upgrades. Thus, from a network provider perspective, there is an urgent need for a system and method for delivering software updates to IoT devices in a way that makes efficient use of the network spectrum, minimizes the cost of network capacity expansion, maximizes the update success rate, and ensures minimal impact to all network users.

DETAILED DESCRIPTION

Figure 1:
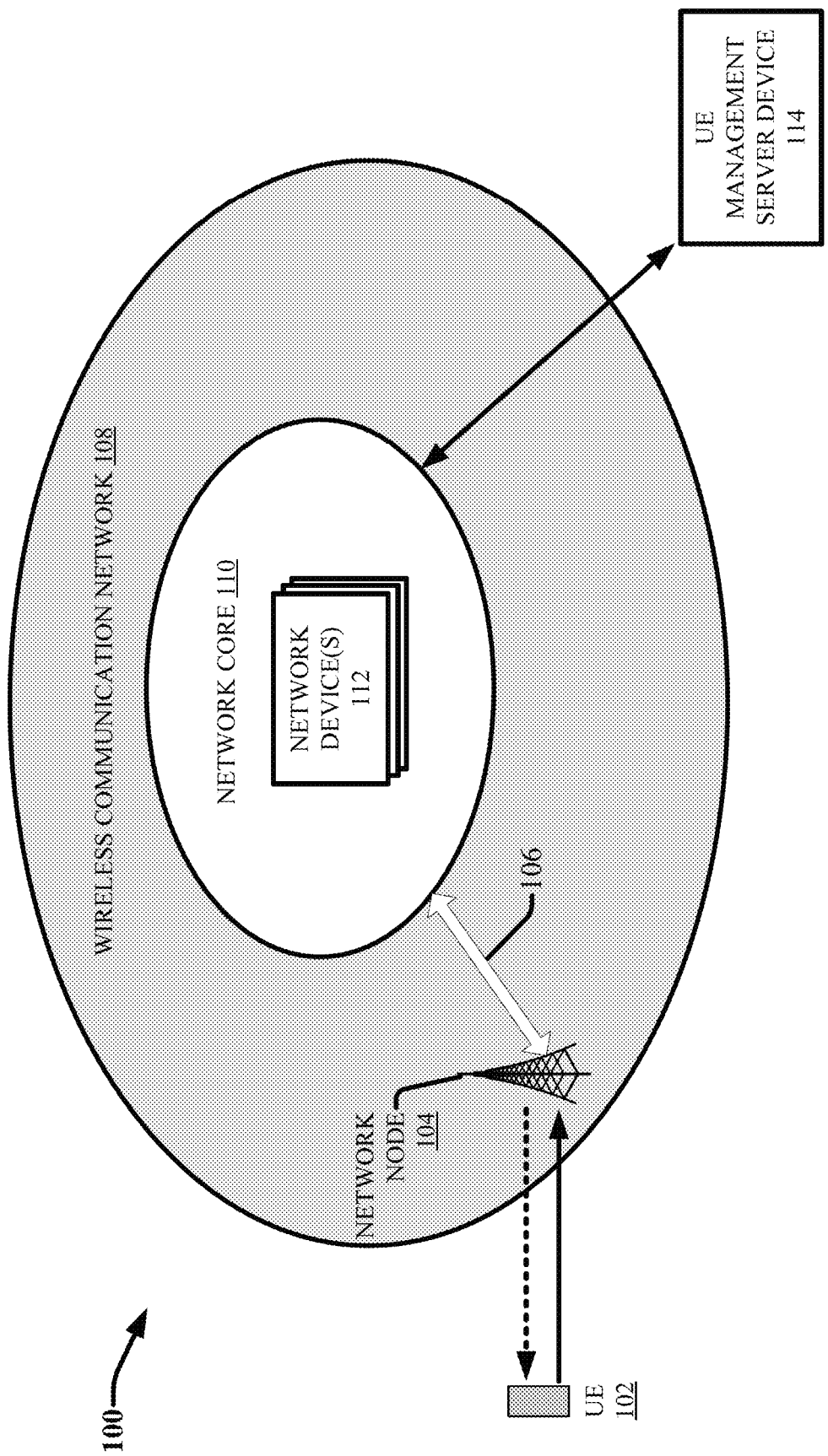
FIG. 1 is an illustration of an example system that facilitates software downloads to Internet of things (IoT) devices over a constrained network in accordance with various aspects and embodiments of the subject disclosure.

Because IoT devices are software-driven, it is inevitable that software updates will be required to maintain the devices, address security holes, or to keep up with technological evolution. Given the widespread deployment and intended form-factor, over-the-air (OTA) updates offer the fastest, most convenient, and cost effective way of delivering software updates to these IoT devices. OTA is a standard for the transmission and reception of application-related information in a wireless communications system. One feature of OTA is that one central entity can send an update to all the clients. This however presents a challenging problem to the network provider. In particular, the network provider must enable the central entity (e.g., the IoT device manufacturer or the entity otherwise responsible for managing performance of the IoT device) to conduct software update campaigns while ensuring available network capacity and maintaining the quality of service to all other network users. Thus, from a network provider perspective, there is an urgent need for a system and method for delivering software updates to IoT devices in a way that makes efficient use of the network spectrum, minimizes the cost of network capacity expansion, maximizes the update success rate, and ensures minimal impact to all network users.

The subject disclosure is directed to computer processing systems, computer-implemented methods, apparatus and/or computer program products that facilitate software downloads to IoT devices over a constrained network in accordance with various aspects and embodiments of the subject disclosure. In this regard, the network is characterized as being "constrained," in that the network capacity and resources are limited and thus shared by all devices serviced by the network. In various embodiments, a software update package (e.g., a data file) can be sent to an IoT device via a wireless communication network (e.g., a cellular network) by a device external to the wireless communication network responsible for providing software updates to the IoT device (e.g., the IoT manufacturer or another suitable entity). In one or more implementations, the software update package can be sent by the device to the IoT device using an OTA messaging protocol. According to these implementations, an IoT manufacturer (or another suitable entity) can send out OTA software updates to a group of IoT devices from a single location and with performing little or no scheduling with the wireless communication network service provider. Thus, the IoT manufacturer can have substantial control over its OTA software update campaigns and enables the IoT manufacturer to initiate OTA software update campaigns at will.

In order to control and minimize the added constrain to the wireless communication network associated with delivering the OTA software updates to end IoT devices, the disclosed systems, methods, apparatus, and/or computer program products provide an intermediary proxy component/device configured to intercept the OTA traffic prior to delivery, by the wireless communication network, to the IoT device via a wireless radio link established between the IoT device and a radio access network (RAN) device of the network. For example, the intermediary proxy component/device can be configured to monitor traffic entering the wireless communication network to identify OTA traffic. The intermediary proxy component/device can further intercept the OTA traffic and apply a low priority transport protocol (LPT) to the OTA traffic. For example, the intermediary proxy component/device can format or configure the OTA traffic according to the LPT protocol and/or associate protocol information with the OTA traffic representative of the OTA protocol. The intermediary proxy component/device can then forward the LPT configured OTA traffic to the RAN device for transmitting to the IoT device according to the LPT protocol.

In various embodiments, the LPT protocol facilitates the dynamic and real-time allocation of network bandwidth for the transmission of the OTA traffic based on the present available capacity and priority of the network traffic flows. In particular, the LPT protocol can comprise a transport protocol that causes the RAN device to assign OTA data packets to only the unused network bandwidth, yielding to existing non-OTA network traffic, thus maximizing the use of network capacity without introducing congestion. Furthermore, the subject techniques allow the IoT manufacturer to set priority of the OTA delivery priority, so that if the software update is of critical nature (e.g., security update), the priority of the traffic stream can be set to be high, allowing it to compete aggressively for the bandwidth with other traffic. The subject techniques make use of the network spectrum highly efficiently, thus minimizing the cost of network capacity expansion, and ensures minimal impact to all network users. Further, the subject techniques do not depend on interaction between the wireless communication network provider and the IoT manufacturer to schedule software updates and are fully efficient without the knowledge of user acceptances of OTA updates.

In one embodiment, a system is provided that comprises a processor and a memory that stores executable instructions that, when executed by the processor, facilitate performance of operations. These operations can comprise intercepting data determined to have been sent to a device for a first transmission to the device via a wireless connection established between the device and a RAN device of a wireless communication network, and determining a type of traffic associated with the data. Based on a determination that the data comprises firmware and that the type of traffic is of a traffic priority that is lower than a defined traffic priority, the operations further comprise preparing the data to be transmitted according to a LPT protocol, resulting in prepared data, and forwarding the prepared data and protocol information representative of the LPT protocol to the RAN device for a second transmission, by the RAN device, of the prepared data to the device using the LPT protocol.

In another embodiment, a method is provided that comprises monitoring, by a network device comprising a processor, data determined to have been sent to a device for transmission to the device via a RAN device of a wireless communication network, and determining, by the network device, a type of traffic associated with the data. The method further includes based on a determination that the data comprises firmware and that the type of traffic is of a traffic priority that is lower than a defined traffic priority, applying, by the network device, a LPT protocol to the data, wherein the applying comprises associating protocol information with the data representative of the LPT protocol.

In yet another embodiment, a machine-readable storage medium, comprising executable instructions that, when executed by a processor, facilitate performance of operations. These operations can comprise receiving first data sent for transmission to a device using a RAN device of a wireless communication network, wherein the receiving the first data is based on a determination that the first data comprises a traffic type applicable to firmware transmitted OTA. These operations can further comprise configuring the first data according to a first transport protocol, resulting in configured data, wherein the first transport protocol enables control of a rate of transmission, by the RAN device, of data packets comprising the first data to be determined based on a current amount of bandwidth of the RAN device that is not allocated for transmission, by the RAN device, of second data using a second transport protocol different than the first transport protocol. These operations further comprise directing the RAN device to transmit the configured data to the device using the first transport protocol.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example system 100 that facilitates software downloads to IoT devices over a constrained network in accordance with various aspects and embodiments of the subject disclosure. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In the embodiment shown, the system 100 can comprise a wireless communication network 108, user equipment (UE) 102, network node 104, and UE management server device 114. The wireless communication network 108 can comprise one or more wireless communication network types, including but not limited to: a cellular network, a femto network, a picocell network, a microcell network, an internet protocol (IP) network, a Wi-Fi service network, a broadband service network, an enterprise network, a cloud based network, and the like. In various embodiments, the wireless communication network 108 can include (or be communicatively coupled to) a variety of different communication network types (e.g., a legacy cellular network, and advance cellular network, and IP network, a picocell network, etc.). It should be appreciated that the wireless communication network 108 is depicted with a single grey oval to signify the unification of various network elements. These network elements can include for example, various sub-networks, network layers (e.g., an access layer, a transport layer, a network layer, an application layer, etc.), network devices, and the like. The architecture of the wireless communication network can vary 108.

The various elements of the wireless communication network 108 can be communicatively coupled via a common network core 110. The term network core or core network signifies the highly functional communication facilities that interconnect primary network nodes. For example, the network core 110 can be configured to deliver routes to exchange information among various sub-networks. For example, in telecommunication networks, the network core can be configured to offer numerous services to the customers who are interconnected by one or more access networks of the wireless communication network 108. The one or more access networks can include network access devices (e.g., network node 104) via which user devices (e.g., UE 102) can connect to the wireless communication network 108. When it comes to enterprise networks that serve a single organization, the term backbone is often used instead of network core, whereas when used with service providers the term core network is prominent.

The wireless communication network 108 is described in association with a service provider that employs the network core 110 to provide communication services to customers (e.g., one or more UEs 102 and the UE management server device 114) via the wireless communication network 108. In some embodiments, the service provider can be or include a cloud service provider. In other embodiments, the communication network service provider can be communicatively coupled to one or more cloud service providers to facilitate providing communication services to customers via one or more wireless can wired communication networks. The term "cloud service provider" is used herein to refer to an organization, company, or group of organizations/companies that offers some component of "cloud computing," such as software as a service (SaaS), infrastructure as a service (IaaS), or platform as a service (PaaS) to other businesses or individuals. "Cloud computing" is a kind of network-based computing that provides shared processing resources and data to computers and other devices on-demand via a network. It is a model for enabling ubiquitous, on-demand access to a shared pool of configurable computing resources (e.g., networks, servers, storage, applications and services), which can be rapidly provisioned and released with minimal management effort. Cloud computing and storage solutions provide users and enterprises with various capabilities to store and process their data in third-party data centers.

It should be appreciated that a single UE 102 is depicted for exemplary purposes and that any number of UEs can be included in system 100. The UE 102 can include a variety of different mobile and stationary device types that can be configured to operate using the one or more wireless and/or wired communication networks provided by the communication service provider. For example, the UE 102 can include but is not limited to: a cellular phone, a smartphone, a tablet computer, a wearable device, a virtual reality (VR) device, a heads-up display (HUD) device, and the like. In various exemplary embodiments, the UE 102 can be an IoT device. For example, the UE 102 can be or include a metering device, an implantable medical device (IMDs), a sensor and/or control device (e.g., associated with home automation systems), a tracking device, a point of sale device (e.g., a vending machine), a security device (e.g., associated with surveillance systems, homes security, access control, etc.), a connected car, a component of a machine, and the like. In some implementations, the UE 102 can include a machine type communication device (e.g., a Category-M1 device (Cat-M1), a Cat-M2 device, narrowband (NB)-IoT device, a Cat-0 device, Cat-1 device, and the like).

The UE 102 can be configured to communicate with the network core 110, and more particularly one or more network devices 112 of the network core 110, using a communication link established between the UE 102 and a network node 104 of the wireless communication network 108. Likewise, the UE management server device 114 can be configured to communicate with the network core 110 via another suitable network node (not shown), which can vary depending on the type of access network employed). The network node 104 can be connected to the network core 110 (i.e., one or more network devices 112 of the network core 110) via one or more backhaul links 106. For example, the one or more backhaul links can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation). The solid arrow line from the UE 102 to the network node 104 represents uplink communications and the dashed arrow line from the network node 104 to the UE 102 represents downlink communications.

The non-limiting term network node (or radio network node) is used herein to refer to any type of network node serving a device (e.g., UE 102, UE management server device 114, etc.) and connected to one or more additional network devices which the device can receive a radio signal. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like.

The wireless communication network 108 can employ various wireless communication technologies and modulation schemes to facilitate wireless radio communications between devices (e.g., between UEs, between a UE and the network node 104, between the network node 104 and one or more network devices 112, between a UE and the UE management server device 114, etc.). For example, the UEs 102 can be configured to communicate with the network node 104, and vice versa using various wireless communication technologies, including but not limited to: Global System for Mobile communication (GSM), Universal Mobile Telecommunications System (UMTS) technologies, LTE technologies, advanced LTE technologies (including voice over LTE or VoLTE), narrowband IoT (NB-IoT), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Third Generation Partnership Project (3GPP) technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIGBEE® technologies, or another IEEE 802.XX technology. Additionally, substantially all aspects disclosed herein can be exploited in legacy telecommunication technologies.

Thus in various embodiments, the network core 110 can be configured to facilitate seamless connections between devices communicating using a plurality of different communication technologies (e.g., from legacy telecommunication technologies to 5GGP technologies and beyond). In this regard, in some implementations, the wireless communication network 108 can embody a next-generation network (NGN). The term NGN is used to refer to a body of key architectural changes in telecommunication core and access networks. In implementations in which the wireless communication network 108 embodies an NGN, the network core 110 can be configured to transport all information and services (voice, data, and all sorts of media such as video) by encapsulating the data traffic into IP packets and transporting the IP packets using an Internet protocol. In some implementations, the network core 110 can consolidation several (dedicated or overlay) transport networks, each historically built for a different service, into one core transport network (often based on IP and Ethernet). This can include for example, the migration of voice from a circuit-switched architecture (e.g., PSTN) to VoIP, and also migration of legacy services such as X.25, frame relay (e.g., either commercial migration of the customer to a new service like IP VPN, or technical emigration by emulation of the "legacy service" on the NGN).

The network core 110 can include various network devices 112 that facilitate providing wireless communication services to client devices (e.g., UE 102, UE management server device 114, etc.) via the network node 104 and/or various additional network devices (not shown). These network devices 112 can include both physical devices and virtual devices. Some example, network devices 112 can include but are not limited to: a mobile switching center (MSC) device, a home location register (HLR) device, a visitor location register (VLR) device, an authentication center (AUC) device, a provisioning server, a billing server, an operation and support system (OSS) device, a short message service center (SMSC) device, a serving gateway (SGW), a policy and charging rules function (PCRF) server, the multi-streaming processors (MSP), the packet data network (PDN) gateway, and the like.

In various embodiments, the one or more network devices 112 can include at least one network device that is configured to facilitate providing firmware to IoT devices (e.g., UE 102) over the wireless communication network 108. For example, the firmware can include data that facilitates controlling or monitoring data manipulation by the IoT devices, including but not limited to: software update data, configuration settings data, encryption key data, and the like. Such a network device is referred to herein as the transport layer proxy device, however, it should be appreciated that the name of the device is arbitrary. In computer networking, the transport layer is a conceptual division of methods in the layered architecture of protocols in the network stack in the IP suite and the Open Systems Interconnection (OSI). The transport layer is the layer is responsible for end-to-end communication over a network. The transport layer provides logical communication between application processes running on different hosts within a layered architecture of protocols and other network components. The transport layer is also responsible for the management of error correction, providing quality and reliability to the end user. This layer enables the host to send and receive error corrected data, packets or messages over a network (e.g., the wireless communication network 108) and is the network component that allows multiplexing.

The protocols of the transport layer provide host-to-host communication services for applications. For example, the transport protocol provides services such as connection-oriented data stream support, reliability, flow control, and multiplexing. Thus the particular transport protocol associated with data controls the manner in which data is transmitted from the network node 104 to the UE device 102. In various embodiments, the transport layer proxy device can be configured to facilitate one or more transport layer functionalities of the wireless communication network 108. In this regard, the transport layer proxy device can be configured to apply or assign the transport layer protocols to traffic that is transmitted by the network node 104 to UE 102 (and other devices). The network node 104 can further be configured to deliver data to devices (UE 102) according to the transport layer protocol applied to the data.

Figure 2:
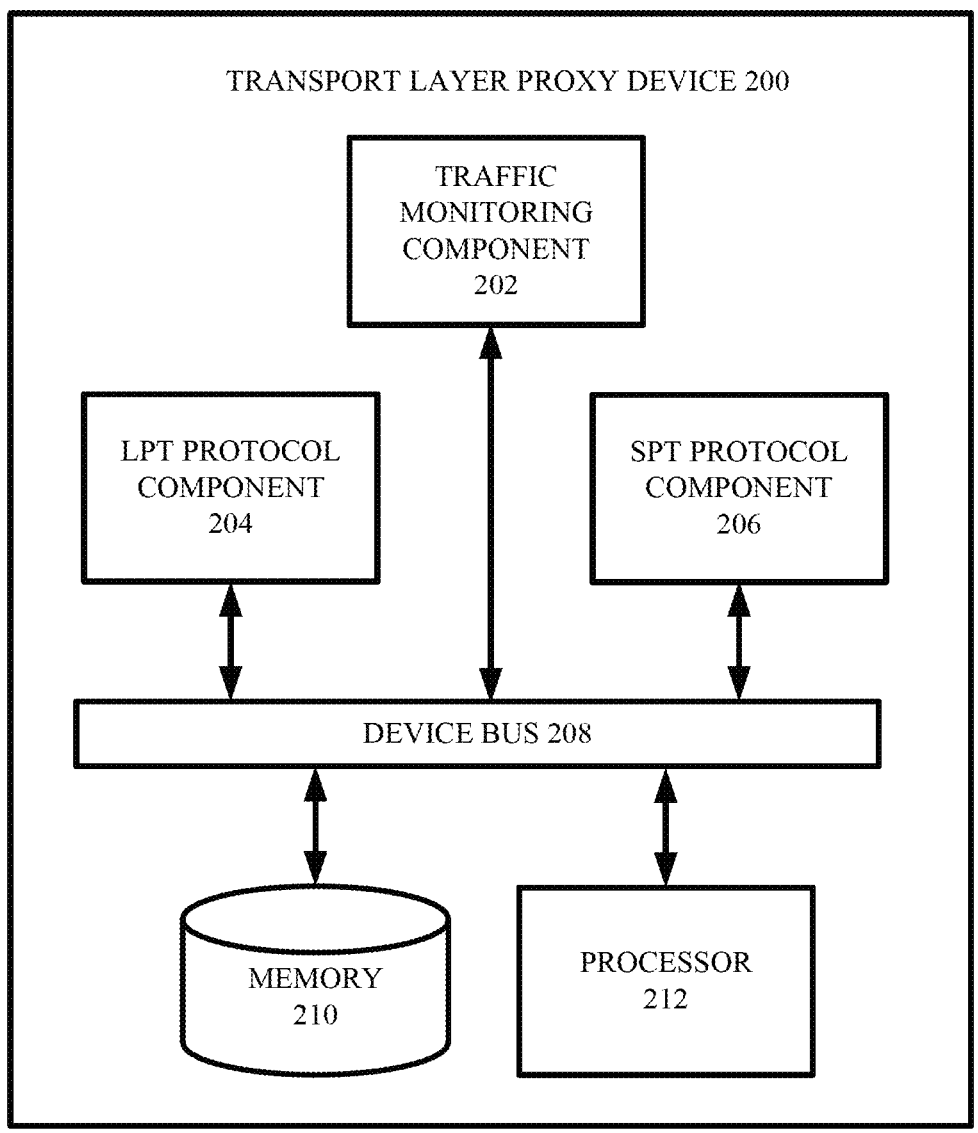
FIG. 2 presents an example transport layer proxy device in accordance with various aspects and embodiments of the subject disclosure.

FIG. 2 presents an example transport layer proxy device 200 in accordance with various aspects and embodiments of the subject disclosure. With reference to FIGS. 1 and 2, the transport layer proxy device 200 can include software, hardware, or a combination of software and hardware that facilitates delivering firmware data to IoT devices (e.g., UE 102) via the wireless communication network 108. In one or more embodiments, the firmware data can be sent to the IoT devices (e.g., UE 102) via an external device (e.g., external to the wireless communication network 108) that is controlled by an external entity, such as the manufacturer of the IoT devices or another suitable entity responsible for providing firmware data (e.g., software updates) to the IoT devices. For example, with regard to system 100, the external device includes the UE management server device 114.

In various embodiments, the transport layer proxy device 200 can be configured to intercept traffic flows between the UE 102 and the UE management server device 114 that include defined firmware data for the UE 102. The transport layer proxy device 200 can further be configured to control the delivery of the firmware data to the UE 102 by the network node 104 in a manner that makes efficient use of the wireless communication network 108 spectrum, minimizes the cost of network capacity expansion, maximizes the update success rate, and ensures minimal impact to all network users. As described in detail below, this can be accomplished by applying or assigning different transport protocols to different types traffic that are handled by the network node 104 based on priority classifications associated with the different types of traffic. The different transport protocols can control the amount of network resources allocated for the delivery of the traffic by the network node 104, wherein lower priority traffic is allocated less network resources (e.g., bandwidth) relative to higher priority traffic. In various implementations, these different transport protocols can include at least a low priority transport (LPT) protocol and a standard priority transport (SPT) protocol, wherein traffic configured for delivery using the SPT protocol is given priority over available network resources relative to traffic configured for delivery using the LPT protocol. In this regard, defined firmware traffic can be associated with a lower priority classification relative to other types of traffic delivered by the network node 104 considered higher priority traffic. The lower priority traffic (i.e., the firmware traffic) can thus configured for delivery using the LPT protocol and the higher priority traffic can be configured for delivery using the SPT protocol (or another suitable protocol that provides higher priority allocation of network resources relative to the LPT protocol). As a result, in some implementations, the network node 104 can allocate less network resources for the delivery of the firmware traffic relative to the other higher priority types of traffic.

In the embodiment shown, the transport layer proxy device 200 can include traffic monitoring component 202, LPT protocol component 204, and SPT protocol component 206. The transport layer proxy device 200 can further include or otherwise be associated with at least one memory 210 that stores computer-executable components or instructions (e.g., the traffic monitoring component 202, the LPT protocol component 204, and the SPT protocol component 206). The transport layer proxy device 200 can also include or otherwise be associated with at least one processor 212 that executes the computer-executable components/instructions stored in the memory 210. The transport layer proxy device 200 can further include a device bus 208 that communicatively couples the various components of the transport layer proxy device 200, including but not limited to, the traffic monitoring component 202, the LPT protocol component 204, and the SPT protocol component 206, the memory 210 and the processor 212. Examples of said processor and memory, as well as other suitable computer or computing-based elements that can be employed by the transport layer proxy device 200 to facilitate providing firmware to IoT devices via the wireless communication network 108 can be found with reference to FIG. 10. Repetitive description of like elements employed in respective embodiments is omitted for sake of brevity.

In some embodiments, the one or more network devices 112 can include transport layer proxy device 200 and/or one or more components of transport layer proxy device 200. However, the particular location of the transport layer proxy device 200 and/or the components of the transport layer proxy device 200 can vary so long as the function of applying a LPT protocol to the firmware traffic being directed to an IoT device (e.g., UE 102) is performed prior to the delivery of the firmware traffic to the IoT device by the network node 104, and so long as the LPT protocol assigned to the firmware traffic remains intact. For example, the location of the transport layer proxy device 200 can vary so long as the transport layer proxy device 200 serves as the LPT endpoint, (and in some implementations the SPT endpoint), towards the destination device (e.g., UE 102) that is receiving the traffic from the network node 104 such that the LPT would encompass the radio link between the destination device and the network node. For instance, in another embodiment, one or more components of the transport layer proxy device 200 can be distributed between two or more of the network devices 112. In another example, one or more components of the transport layer proxy device 200 can be located at the network node 104 and or a network device of the wireless communication network 108 located outside of the network core 110. Still in yet another embodiment, one or more components of the transport layer proxy device 200 can be located at an external device that is external to the wireless communication network 108. For example, one or more components of the transport layer proxy device 200 can be associated with a content delivery network (CDN) employed by the UE management server device 114. With these embodiments, the external device can be communicatively coupled to the network core 110 and/or the network node 104.

In various embodiments, the transport layer proxy device 200 can be configured to facilitate and manage the delivery, via the wireless communication network 108, of various types of traffic to UEs (e.g., UE 102) connected to the network core 110 via a network node 104. In this regard, the transport layer proxy device 200 can serve as an intermediary device between the traffic sender (e.g., the UE management server device 114) and the traffic recipient (e.g., the UE 102) and apply the appropriate transport layer protocols to the traffic based in part on a type or classification of the traffic. In particular, the wireless communication network 108 can be configured to support the communication of a variety of different types of traffic between different types of devices and applications. For example, the various types of traffic can include but are not limited to: bursty traffic (e.g., firmware, file downloads, Hypertext Transfer Protocol (HTTP) traffic, file transfer protocol (FTP) downloads, graphics, video content, etc.), interactive traffic (e.g., web browsing, online purchasing, SSL transactions, instant messaging), latency sensitive traffic (e.g., voice calls, video calls, voice and video call, VoIP, online gaming, video conferencing, etc.), and non-real time traffic (e.g., email, batch processing applications, etc.). The various type of traffic can comprise both IP based traffic and non-IP based traffic, however, with regard to IoT devices, the majority of traffic will comprise IP based traffic. Further, in some implementations, the network core 110 can be configured to convert all non-IP traffic entering the wireless communication network 108 to IP type traffic (e.g., to packets).

In one or more embodiments, the traffic monitoring component 202 can be configured to monitor the various types of traffic entering the wireless communication network 108. The traffic monitoring component 202 can further be configured to classify or identify the different types of traffic based on one or more characteristics of the traffic. In particular, traffic classification is an automated process that categorizes computer network traffic according to various parameters (for example, based on port number or protocol) into a number of traffic classes. Each resulting traffic class can be treated differently in order to differentiate the service implied for the user (data generator/consumer). In various embodiments, the traffic monitoring component 202 in associating with classifying traffic entering the wireless communication network 108, the traffic monitoring component 202 can be configured to distinguish between firmware traffic (e.g., software updates) and non-firmware traffic (e.g., voice and video calls, streaming media, web-browsing, etc.). For example, the traffic monitoring component 202 can be configured to identify firmware data that is sent to UE 102 from the UE management server device 114. In some embodiments, the traffic monitoring component 202 can be configured to identify such firmware traffic based on one or more distinguishing characteristics of the traffic, including but not limited to: a traffic source domain name, a network identifier associated with the source device (e.g., the source IP address), a cellular access point name (APN), a proxy auto-config (PAC) file, the application layer protocol, a network identifier associated with the recipient device, and the like. According to these embodiments, the traffic monitoring component 202 employ information (e.g., stored in memory 210 or at another accessible device) that associates one or more defined traffic characteristics with a traffic classification of firmware to facilitate classifying traffic as firmware or not.

In some embodiments, an IoT server device or management application (e.g., UE management server device 114) can be configured to send firmware to IoT devices (e.g., UE 102) using OTA programming. In this regard, the firmware can be considered firmware over-the-air (FOTA). FOTA is a standard for the transmission and reception of application-related information (e.g., new software, configuring settings, updated encryption keys, etc.) in a wireless communications network (e.g., wireless communication network 108). One feature of OTA programming is that one central entity (e.g., the UE management server device 114) can send a software update a group of clients. Given the widespread deployment and intended form-factor, FOTA updates offer a fast, convenient, and cost effective way for delivering software updates to these IoT devices. With these embodiments, the traffic monitoring component 202 can be configured to identify firmware traffic that has been sent to an IoT device (e.g., UE 102) for delivery via the wireless communication network 108 (e.g., via the radio link established between the UE 102 and the network node 104) based on the firmware being received as FOTA traffic. For example, the traffic monitoring component 202 can be configured 204 to identify FOTA traffic entering the wireless communication network 108 that is directed to an IoT device connected to the wireless communication network 108 based one or defined distinguishing characteristics of FOTA traffic, including but not limited to: source domain name, IP address, cellular APN, PAC file, application layer protocol, and the like. In some implementations, the traffic monitoring component 202 can also distinguish between different types of FOTA traffic. The traffic monitoring component 202 also employ information (e.g., stored in memory 210 or at another accessible device) that associates one or more defined traffic characteristics with a traffic classification of as FOTA traffic, and/or different types FOTA traffic.

Based on recognition of traffic or a traffic flow (e.g., comprising data, one or more data packets, a data file, etc) that is or comprises firmware and/or is FOTA traffic, the traffic monitoring component 202 can be configured to intercept the traffic flow and re-direct the traffic flow to the LPT protocol component 204. The LPT protocol component 204 can be configured to apply or assign a LPT protocol to the firmware/FOTA traffic flow prior to delivery of the firmware/FOTA traffic to the recipient UE. Applying or assigning a particular transport protocol to data involves associating transport protocol information with the data that represents the particular transport protocol. Based on association of the particular transport protocol information with the data, the network device (or devices) that receive the data can identify the transport protocol assigned to it and deliver it accordingly. Thus in essence, the LPT protocol component 204 can be configured to receive LPT data/traffic (e.g., firmware), re-package the data with low priority transport information that represents the LPT transport protocol, and then send it to the RAN device for delivering to the UE according to the LPT protocol. To draw an analogy to a standard mail system, the operation of the LPT protocol component 204 would be similar to intercepting a letter that was sent using an expedited delivery envelope, putting the letter into a low priority delivery envelope, and then sending it back out in the low priority delivery envelope. For example, in some implementations, application of the LPT transport protocol to the firmware/FOTA traffic flow can involve configuring or preparing the data of the firmware/FOTA traffic flow with a defined format that corresponds to the LPT transport protocol. In this regard, the LPT device can apply defined information (e.g., defined correct headers) to the data or otherwise format the data according to a defined format used for the LPT protocol. When the network node 104 receives the data with the LPT format/configuration, it will recognize the data as having the LPT transport protocol applied to it. The network device will then transmit the data to the end device according to the LPT protocol rules (which the network node will know and be configured to follow). In another implementation, in addition to or alternative to configuring or formatting the data according to a manner defined by the LPT protocol, the LPT protocol component 204 can be configured to associate LPT protocol information with the data that represents the LPT protocol. The LPT component 204 can then provide the data and the protocol information to the network node 104. The network node can further be configured to transmit the data according to the LPT protocol rules based on the LPT protocol information being associated with the data.

In various embodiments, the LPT protocol can comprise a transport protocol that controls the transmission of data by a network node (e.g., network node 104) to a destination UE such that it is transmitted from the network node to the destination UE (e.g., UE 102) at a lower priority relative to other data traffic that is handled by the network node 104 (e.g., non-firmware/FOTA traffic). In some embodiments, the traffic monitoring component 202 can also be configured to intercept and/or direct non-firmware/FOTA to the SPT protocol component 206. The SPT protocol component 206 can be configured to apply a SPT protocol to the non-firmware/FOTA traffic flow prior to delivery of the non-firmware/FOTA traffic to the recipient UE. The SPT protocol can comprise a transport protocol that controls the transmission of data by a network node (e.g., network node 104) to a destination UE such that it is transmitted from the network node to the destination UE (e.g., UE 102) at a higher priority relative to the firmware/FOTA traffic. For example, the SPT protocol can comprise the transmission control protocol (TCP) or another suitable transport layer protocol that prioritizes network resource allocation to the non-firmware/FOTA traffic over the firmware/FOTA traffic (e.g., TCP Reno, TCP binary increase congestion control (TCP-BIC), CUBIC, or the like).

For example, the TCP is one of the main transport protocols of IP suite. The TCP provides a communication service at an intermediate level between an application program and the IP. The TCP provides host-to-host connectivity at the transport layer of the Internet model. The TCP provides reliable, ordered, and error-checked delivery of a stream of octets between applications running on hosts communicating by an IP network. For example, at the transport layer, the protocol handles all handshaking and transmission details and presents an abstraction of the network connection to the application. The TCP determines how to break application data into packets that networks can deliver, sends packets to and accepts packets from the network layer, and manages flow control. The TCP also handles retransmission of dropped or garbled packets as well as acknowledgement of all packets that arrive. For example, at the lower levels of the protocol stack, due to network congestion, traffic load balancing, or other unpredictable network behavior, IP packets may be lost, duplicated, or delivered out of order. The TCP detects these problems, requests re-transmission of lost data, rearranges out-of-order data and even helps minimize network congestion to reduce the occurrence of the other problems. If the data still remains undelivered, the source is notified of this failure. Once the TCP receiver has reassembled the sequence of octets originally transmitted, it passes them to the receiving application. Thus, TCP abstracts the application's communication from the underlying networking details. The TCP is the defacto standard across most wireless networks, comprising cellular. One of the main tasks of the TCP is congestion control. In this regard, the TCP is a fair sharing protocol, so that when multiple traffic flows from multiple devices enter the same network node (e.g., network node 104), they essentially converge to the fair share of the bandwidth. For this purpose, TCP uses a number of mechanisms to achieve high performance and avoid situations of degrading network performance. These mechanisms control the rate of data entering the network, keeping the data flow below a rate that would trigger collapse. They also attempt to achieve an approximately "fair share" allocation of network resources between different flows in the network.

While standard TCP and its variants endeavor to achieve a fair share of the network bottleneck capacity between flows, a LPT protocol can comprise a transport protocol that aims at providing a less than fair share of the network capacity at traffic considered lower priority than other traffic (e.g., the subject software update traffic). For example, in various exemplary embodiments, a LPT protocol can comprise a transport protocol that that dynamically allocates network resources to traffic considered lower priority traffic (e.g., firmware/FOTA traffic) based on the amount of available network resources that are not being used for higher priority traffic (e.g., transported using TCP). In this regard, a LPT protocol can employ an algorithm that detects the amount of available bandwidth not used by the network node 104 to transport higher priority traffic (e.g., using the TCP protocol or another fair sharing protocol). The LPT protocol can then assign the available bandwidth and associated downlink throughput to the low priority traffic. Accordingly, LPT flows can take up the unused portion of the network pipe. LPT flows further remain non-intrusive to existing traffic by yielding to TCP flows that share the same bottleneck link (e.g., at the network node 104). Accordingly, LPT flows can be configured to use as much bandwidth that is currently available at any point in time, ramping up at time of low TCP traffic and backing off at times of high TCP traffic. Some example suitable LPT protocols can comprise but are not limited to, low extra delay background transport (LEDBAT) protocol, NICE, TCP-LP.

Figure 3:
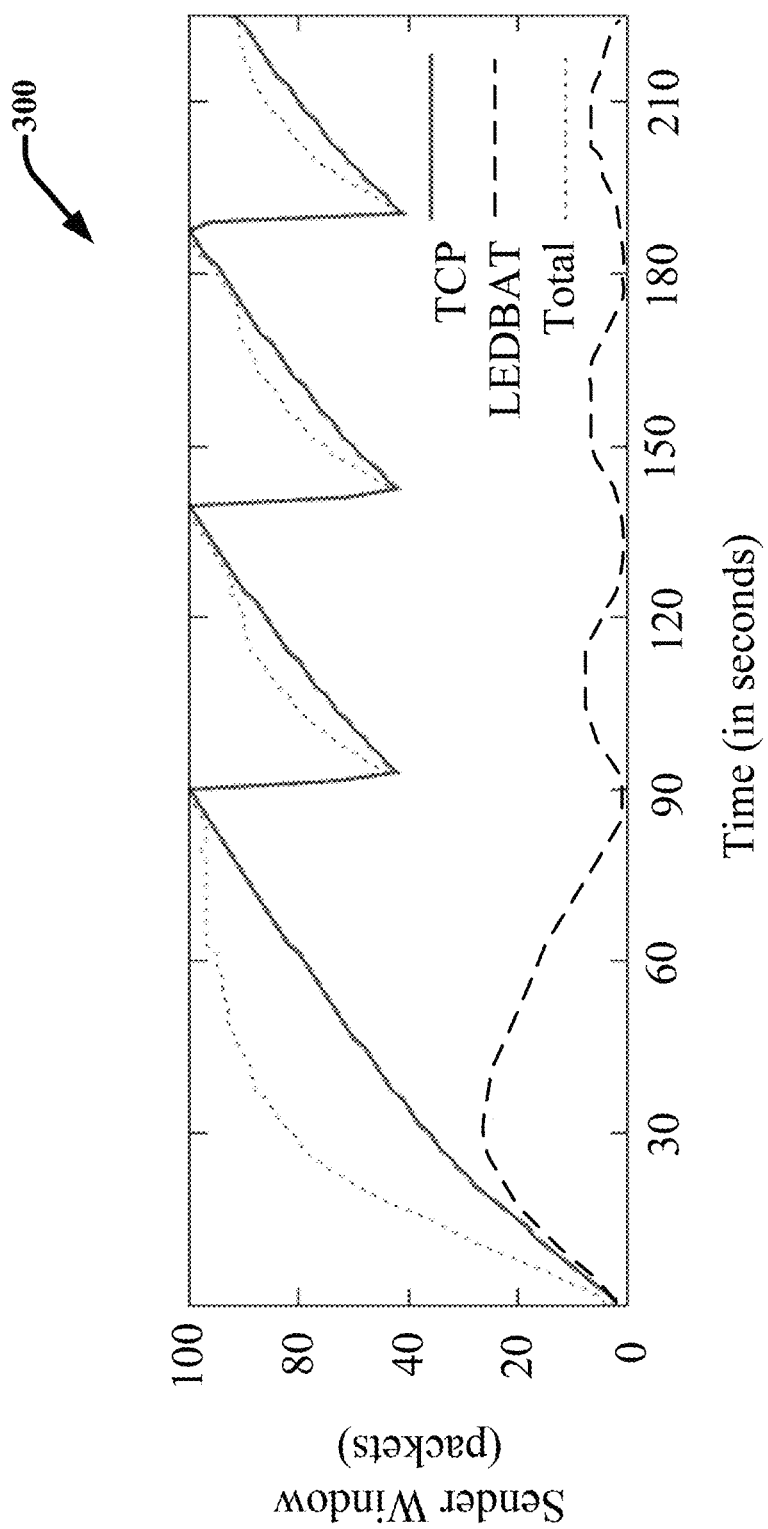
FIG. 3 provides a chart illustrating the interaction between utilization of network bandwidth in association with concurrent delivery of regular priority traffic (RPT) and low priority traffic (LPT) in accordance with various aspects and embodiments of the subject disclosure.

FIG. 3 provides a chart 300 illustrating the interaction between utilization of network bandwidth in association with concurrent delivery of regular priority traffic (RPT) and low priority traffic (LPT) in accordance with various aspects and embodiments of the subject disclosure. Chart 300 plots the amount of data packets used by the RAN (i.e., the sender window) to concurrently transmit LPT data and TCP data over a period of time. The solid line corresponds to TCP traffic (i.e., traffic transmitted according to the TCP protocol), and the lower dashed line corresponds to LPT traffic (i.e., traffic transmitted according to the LCP protocol, specifically the LPT protocol known as LEDBAT). The upper dashed line corresponds to the total traffic. As shown by the chart 300, as the amount of packets utilized for the transmission of TCP traffic increases, the amount of packets utilized for LPT traffic decreases. For example, as the amount of TCP traffic increases from time 30 seconds to about time 85 seconds, the amount of LPT traffic decreases. When the TCP traffic is at its highest packet utilization point at about time 85 seconds, the amount of packets available for the transmission of LPT traffic drops to substantially zero. In this regard, the LPT traffic backs off as the TCP traffic increases. Once the TCP traffic drops at about time 95 seconds), the LPT traffic begins ramping up again. This process can continues dynamically over time.

Thus in one or more embodiments, the LPT protocol component 204 can be configured to apply or assign a LPT protocol to firmware/FOTA traffic that causes the traffic to be transmitted by the network node 104 to the destination IoT device in the manner depicted in chart 300. For example, the LPT protocol component 204 can apply or assign a LPT protocol to the firmware/FOTA traffic and then forward the firmware/FOTA traffic to the network node (e.g., network node 104) for transmission to the destination UE (e.g., UE 102) connected to the network node. Likewise, the SPT protocol component 206 can apply or assign a SPT protocol to the non-firmware/FOTA traffic and then forward the non-firmware/FOTA traffic to the network node (e.g., network node 104) for transmission to the destination UE (e.g., UE 102 or another UE) connected to the network node. The network node can further determine the amount of bandwidth and/or throughput rate for the transmission of the LPT traffic and the SPT traffic dynamically based on the congestion control mechanisms defined by the LPT and SPT protocols, respectively, and the present bandwidth capacity of the network node 104.

For example, the congestion control mechanism defined by the LPT protocol can comprise one or more parameters/algorithms that direct the network node how to transmit LPT the traffic. For example, in some implementations, the one or more parameters can instruct the network node to employ a defined amount of bandwidth for the transmission of the LPT traffic. The one or more parameters/algorithms can further direct the network node to determine the defined amount of bandwidth based on the amount of bandwidth allocated to non-LPT traffic (e.g., SPT traffic). In this regard, the LPT protocol can direct the network node to monitor and/or determine a current amount of available bandwidth of the network node that is not allocated for the transmission of non-LPT traffic. The LPT protocol can further direct the network node to allocate only this amount of available bandwidth for the transmission of LPT traffic. In some implementations, the one or more parameters/algorithms of the LPT protocol can also direct the network node to determine and apply throughput rate for the transmission of the LPT traffic based on the amount of available bandwidth.

In one or more alternative embodiments, the LPT protocol can be configured to control the transmission of the LPT traffic at a lower priority relative to other traffic by directing the network node 104 to transmit the software update traffic at fixed lower bandwidth relative to the other traffic. In another implementation, the LPT protocol can be configured to control the transmission of the software update traffic at a lower priority relative to other traffic by directing the network node 104 to transmit the software update traffic the software update traffic at a fixed lower throughput relative to the other traffic.

In some embodiments, the transport layer proxy device 200 can further provide for IoT manufacturers to assign or associate different priority levels to firmware/FOTA traffic. For example, certain firmware/FOTA traffic may be more critical than other traffic (e.g., a security update may be more critical than an interface configuration update). According to these embodiments, the traffic monitoring component 202 can further be configured to distinguish between different types of firmware/FOTA traffic. For example, the traffic monitoring component 202 can be configured to identify a priority level associated with different types of firmware/ FOTA traffic based on one or more characteristics of the traffic. For example, the priority levels can comprise a low priority level and a high priority level. In another example, the priority levels can comprise three or more different degrees of priority levels. In some implementations, the priority level can be applied by the IoT manufacturer. For example, the IoT manufacturer can associate metadata or some defined attribute to an FOTA update initiated by the IoT manufacturer. According to this example, the traffic monitoring component 202 can be configured to detect the attribute and determine a priority level associated with the FOTA update based on the attribute.

With these embodiments, the transport layer proxy device 200 can be configured to apply different transport layer protocols to the firmware/FOTA traffic based on its priority level. For example, in some implementations, the traffic monitoring component 202 can be configured to forward low priority firmware/FOTA traffic to the LPT protocol component 204 for application of a LPT protocol. The traffic monitoring component 202 can further be configured to forward high priority firmware/FOTA traffic to the SPT protocol component 206 for application of a SPT protocol. In other implementations, the LPT protocol component 204 and/or the SPT protocol component 206 can respectively be configured to apply two or more different types of LPT protocols or SPT protocols. For example, the LPT protocol component 204 can be configured to apply an LPT protocol-1, an LPT protocol-2, an LPT protocol-3, etc. Likewise, the SPT protocol component 206 can be configured to apply an SPT protocol-1, an SPT protocol-2, an SPT protocol-3, etc. Each of the different LPT and/or SPT protocols can be tailored to provide a different congestion control mechanism, wherein each of the different congestion control mechanisms cause the network node to apply a different amounts of network bandwidth and different amounts of throughput for the delivery of traffic. Each of the different transport protocols can configured for application to a defined traffic type based on the priority level of the traffic type. For example, higher priority traffic can be assigned to higher priority transport protocols that allocate a higher amount of network bandwidth and/or a higher throughput rate relative to lower priority transport protocols. For instance, firmware/FOTA traffic classified as a level-2 priority level could be assigned to the STP protocol-2, whereas firmware/FOTA traffic classified as level-0 priority level could be assigned to the LPT protocol-1. According to these embodiments, the traffic monitoring component 202 can direct the LPT protocol component 204 and/or the SPT protocol component to apply the appropriate transport protocol to the traffic based on its priority level classification.

The subject techniques for delivering software updates to IoT devices provide dynamic and real-time allocation of bandwidth based on the present available capacity and priority of the network traffic flows. In particular, in various embodiments, firmware/FOTA flows only take up the unused portion of the network pipe, and remain non-intrusive to all other existing traffic. As a result, network congestion avoidance is achieved effortlessly while network capacity is being used at the maximum level. Moreover, the quality of service for all network users is maintained. Furthermore, the subject techniques allow the IoT manufacturer to set priority of the OTA delivery priority, so that if the software update is of critical nature (e.g., security update), the priority of the traffic stream can be set to be high, allowing it to compete aggressively for the bandwidth with other traffic. Further, the subject techniques do not depend on interaction between the wireless communication network provider and the IoT manufacturer to schedule software updates and are fully efficient without the knowledge of user acceptances of OTA updates.

Figure 4:
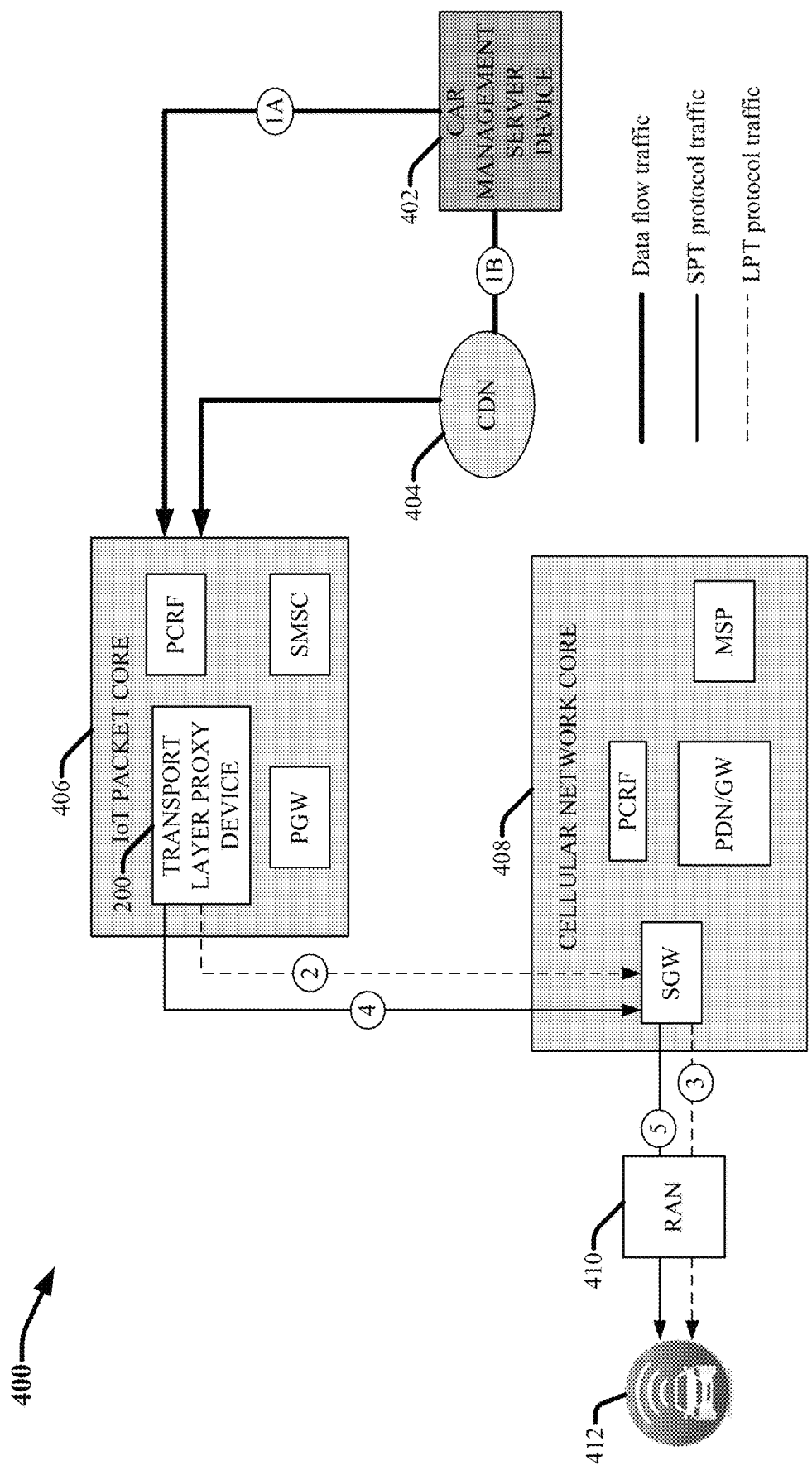
FIG. 4 provides another illustration of an example system that facilitates software downloads to IoT devices over a constrained network in accordance with various aspects and embodiments of the subject disclosure.

FIG. 4 provides an illustration of an example system 400 that facilitates software downloads to IoT devices over a constrained network in accordance with various aspects and embodiments of the subject disclosure. System 400 particularly depicts an example use case of one or more features and functionalities of system 100 as applied to facilitate providing large software downloads to connected cars. Repetitive description of like elements employed in respective embodiments is omitted for sake of brevity.

A connected car is a car that is equipped with Internet access, and usually also with a wireless area network. This allows the car to share internet access with other devices both inside as well as outside the vehicle. Often, the car is also outfitted with special technologies that tap into the internet or wireless area network (RAN) and provide additional benefits to the driver. Examples comprise: automatic notification of crashes, notification of speeding and safety alerts, etc. Concierge features provided by automakers or apps can alert the driver of the time to leave to arrive on time from a calendar, send text message alerts to friends or business associates to alert them of arrival times, and/or help find parking or gas stations. Connected cars have become a more dominant presence in wireless communication network. While the average lifespan of a smartphone is 21 months, a car on the average is scrapped after 8 or more years. Therefore, in order to allow customers to keep up with technological evolution, software updates, which can be facilitated OTA can generate efficiencies.

System 400 comprises a car management server device 402, a CDN 404, a IoT packet core 406, a cellular network core 408, a RAN device 410, and a connected car 412. In the embodiment shown, the connected car 412 is connected to cellular network core 408 via a RAN device 410 of the cellular network. The cellular network core 408 can comprise a plurality of network components/devices. For example, in the embodiment shown, the cellular network core 408 comprises an SGW, a PCRF, a PDN/GW, and an MSP. In various embodiments, the cellular network core 408 can provide similar features and functionalities as network core 110. Likewise, the RAN device 410 can provide similar features and functionalities as the network node 104 and the car management server device 402 can provide similar features and functionalities as the UE management server device 114. System 400 also comprises the transport layer proxy device 200. In this embodiment, the transport layer proxy device 200 is located outside the cellular network core 408 at a different device referred to as the IoT packet core 406. The IoT packet core 406 can comprise a real or virtual machine that is communicatively coupled to the cellular network core 408. The IoT packet core 406 is a specialized core dedicated to handling various communications for IoT devices. In the embodiment shown, in addition to the transport layer proxy device 200, the IoT packet core comprises a PCRF, a PGW, and an SMSC.

The connection arrows shown in system 400 demonstrates the flow of traffic between the car management server device 402 and the connected car 412 in association with providing the connected car an FOTA update. For example, in accordance with one example embodiments, after the connected car 412 has accepted a software update download invitation, the car management server device 402 can initiate sending the software update download to the connected car as FOTA data. In some implementations, (shown by arrow 1A), the car management server device 402 can send the FOTA data directly to the IoT packet core 406. In other implementations, (shown by arrow 1B), the car management server device 402 can employ a CDN to distribute the FOTA data to the IoT packet core 406. (In some implementations, the IoT packet PCRF software node can be configured to route all OTA flows to the transport layer proxy device 200 where the LPT protocol is applied). At the IoT packet core 406, the transport layer proxy device 200 intercepts the traffic and determines if the traffic is FOTA traffic or not using a predefined method (e.g., based on source domain name, IP address, cellular APN, PAC file, etc.). If the traffic is FOTA traffic, the transport layer proxy device 200 applies a LPT protocol to the FOTA data and forwards the LPT FOTA data to the core wireless communication network (shown by arrow 2). The LPT FOTA data then flows through the cellular network core 408 and the RAN device 410, and to the connected car 412 (shown by arrow 3). The throughput rate for this LPT FOTA traffic flow can be dynamically determined by the RAN device 410 based on the particular congestion control mechanism provided by the LPT protocol and the present bandwidth capacity of the network elements.

However, if the traffic is not FOTA traffic, the transport layer proxy device 200 applies a SPT protocol (e.g., TCP protocol) to the traffic and forwards the STP traffic to the core wireless communication network (shown by arrow 4). It should be appreciated that although not shown, the source of the non-FOTA traffic can vary. For example, in some implementations, the non-FOTA traffic can be sent from the car management server device 402 or a variety of other applications/device connected to the cellular network core 408 and/or the IoT packet core 406 (e.g., via the Internet). The STP traffic then flows through the cellular network core 408 and the RAN device 410, and to the connected car 412 (shown by arrow 5). The throughput rate for this SPT traffic flow can be dynamically determined by the RAN device 410 based on the particular congestion control mechanism provided by the STP protocol and the present bandwidth capacity of the network elements.

System 400 facilitates adaptive and real-time delivery of software updates to connected cars (e.g., connected car 412) based on the current load of the network node (e.g. RAN device 414) that the vehicle is connected to and through which it will be downloading the software update. System 400 provides for agile adaptation to the current network environment in such a way, that the software update download, which is essentially a low priority communication event, does not harm other traffic, such as radio user traffic that are making calls, browsing the web, watching video etc. There is also a different type of user in this connected car context, which is often referred to as backseat WiFi user. For example, in a car with a cellular connection to a RAN device 410, the care can provides a Wifi access point (AP to inside the car so that passengers can connect to the AP and stream video, browse the web, etc.) System 400 allows for delivering software updates to connected cars in such a manner so as to not harm the connections of these backseat WiFi users.

In view of the example system(s) described above, example method(s) that can be implemented in accordance with the disclosed subject matter can be better appreciated with reference to flowcharts in FIGS. 5-8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
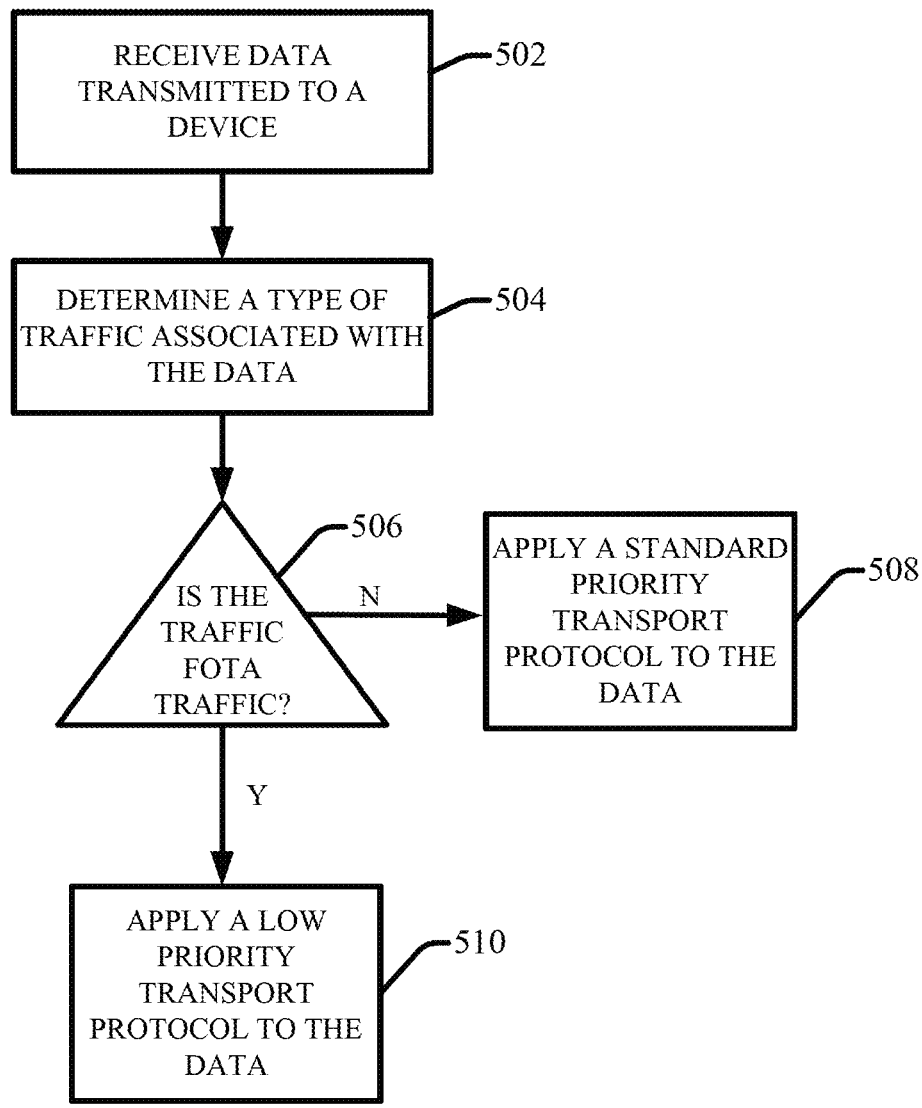
FIG. 5 illustrates an example method that facilitates software downloads to IoT devices over a constrained network in accordance with various aspects and embodiments of the subject disclosure.

FIG. 5 illustrates an example method 500 that facilitates software downloads to IoT devices over a constrained network in accordance with various aspects and embodiments of the subject disclosure. In various exemplary embodiments, method 500 can be performed by the transport layer proxy device 200. Repetitive description of like elements employed in respective embodiments is omitted for sake of brevity.

At 502, transport layer proxy device 200 can receive data transmitted to a device (e.g., UE 102). For example, the device can comprise an IoT device connected to a wireless communication network (e.g., wireless communication network 108) via a suitable access point device (e.g., network node 104). At 504, the transport layer proxy device 200 can determine a type of traffic associated with the data (e.g., using traffic monitoring component 202). At 506, the transport layer proxy device 200 determines whether the traffic is FOTA traffic. If so, at 510, the transport layer proxy device 200 applies a LPT protocol to the data (e.g., using LPT protocol component 204). However, if at 506 the transport layer proxy device 200 determines that the traffic is not FOTA traffic, at 508, the transport layer proxy device 200 applies a SPT protocol to the data (e.g., using SPT protocol component 206).

Figure 6:
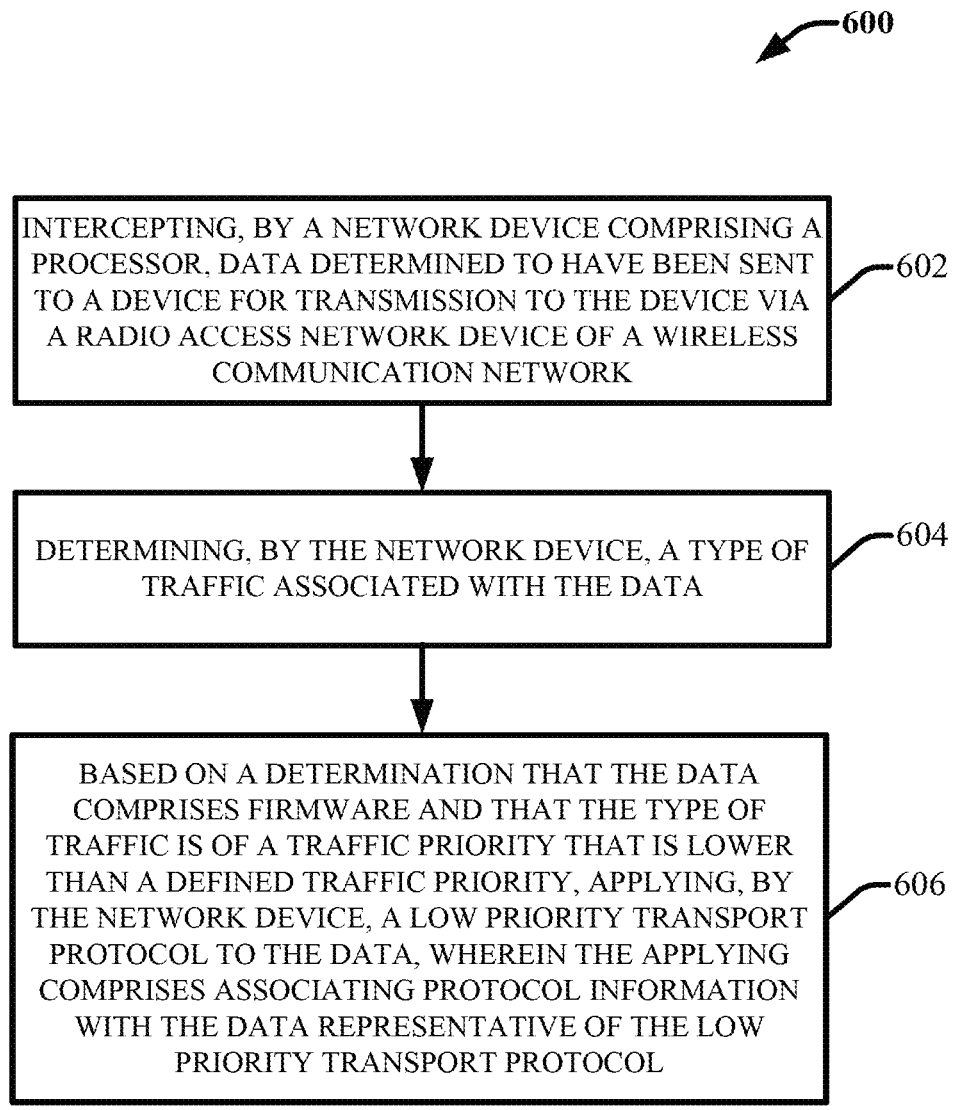
FIG. 6 illustrates another example method that facilitates software downloads to IoT devices over a constrained network in accordance with various aspects and embodiments of the subject disclosure.

FIG. 6 illustrates another example method 600 that facilitates software downloads to IoT devices over a constrained network in accordance with various aspects and embodiments of the subject disclosure. In various exemplary embodiments, method 600 can be performed by the transport layer proxy device 200. Repetitive description of like elements employed in respective embodiments is omitted for sake of brevity.

At 602, a network device comprising a processor (e.g., network device 200) intercepts (e.g., via traffic monitoring component 202) data determined to have been sent to a device (e.g., an IoT device such as UE 102) for transmission to the device via a RAN device (e.g., network node 104) of a wireless communication network (e.g., wireless communication network 108). At 604, the network device determines a type of traffic associated with the data (e.g., using traffic monitoring component 202). At 606, based on a determination that the data comprises firmware and that the type of traffic is of a traffic priority that is lower than a defined traffic priority, applying, by the network device, a LPT protocol to the data, wherein the applying comprises associating protocol information with the data representative of the LPT protocol (e.g., using LPT protocol component 204).

Figure 7:
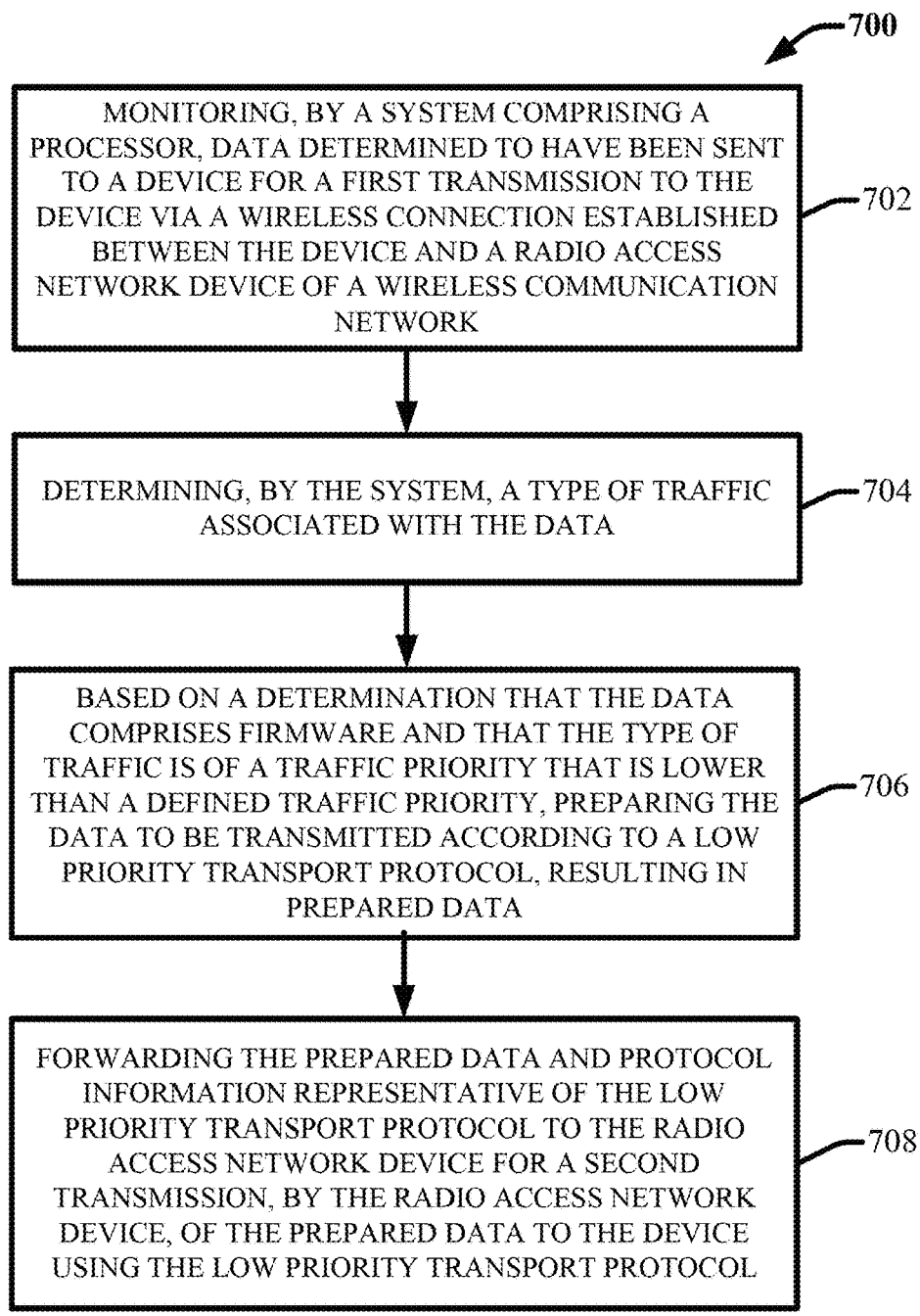
FIG. 7 illustrates another example method that facilitates software downloads to IoT devices over a constrained network in accordance with various aspects and embodiments of the subject disclosure.

FIG. 7 illustrates another example method 700 that facilitates software downloads to IoT devices over a constrained network in accordance with various aspects and embodiments of the subject disclosure. In various exemplary embodiments, method 700 can be performed by the transport layer proxy device 200 and/or network node 104. Repetitive description of like elements employed in respective embodiments is omitted for sake of brevity.

At 702, a system comprising a processor (e.g., wireless communication network 108), monitors data determined to have been sent to a device for a first transmission to the device via a wireless connection established between the device and a RAN device of a wireless communication network (e.g., via monitoring component 202). At 704, the system determines a type of traffic associated with the data (e.g., via monitoring component 202). At 706, based on a determination that the data comprises firmware and that the type of traffic is of a traffic priority that is lower than a defined traffic priority, the system prepares the data to be transmitted according to a LPT protocol, resulting in prepared data (e.g., via LPT protocol component 204). At 708, the system forwards the prepared data and protocol information representative of the LPT protocol to the RAN device for a second transmission, by the RAN device, of the prepared data to the device using the LPT protocol (e.g., via LPT protocol component 204).

Figure 8:
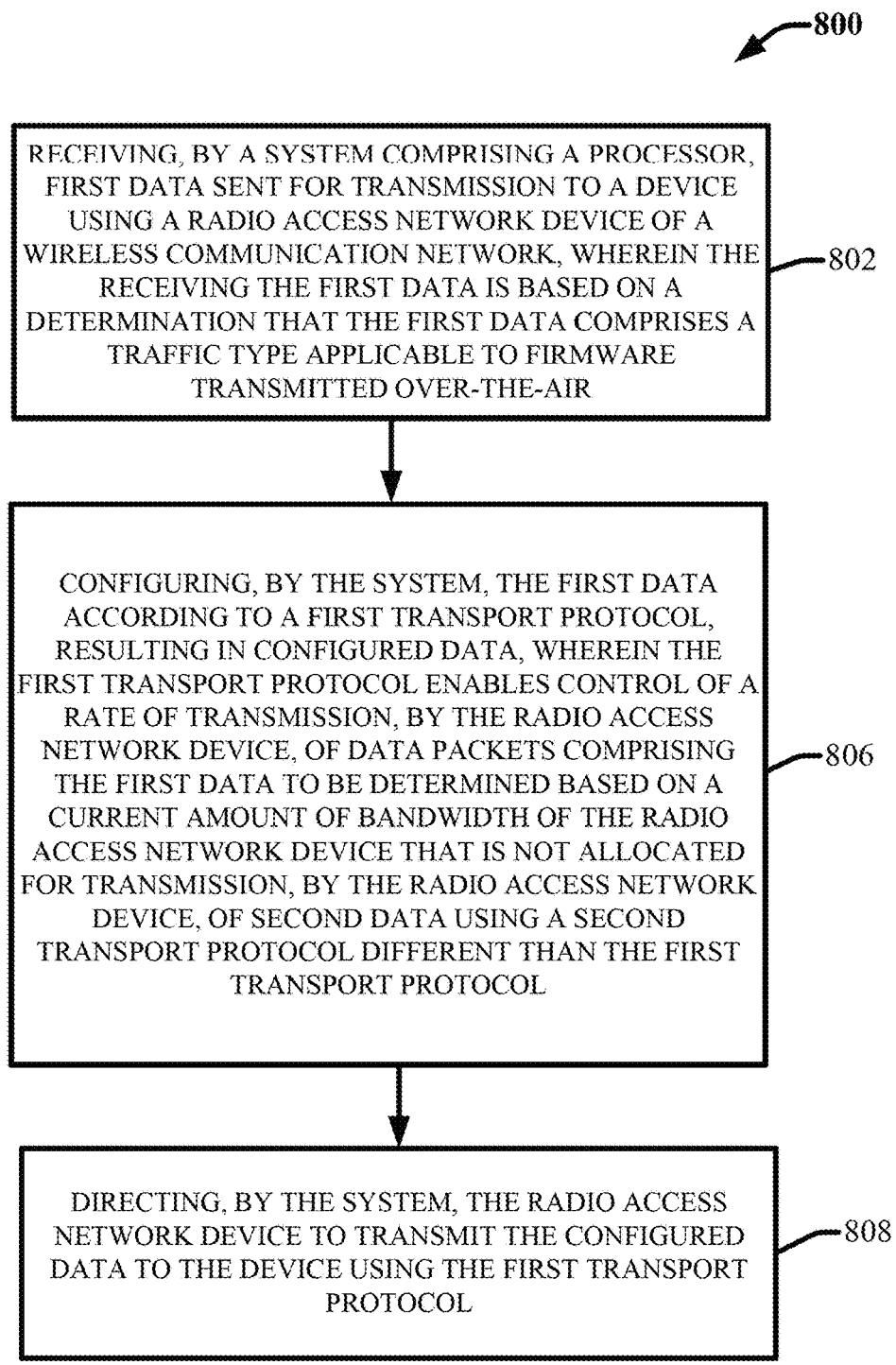
FIG. 8 illustrates another example method that facilitates software downloads to IoT devices over a constrained network in accordance with various aspects and embodiments of the subject disclosure.

FIG. 8 illustrates another example method 800 that facilitates software downloads to IoT devices over a constrained network in accordance with various aspects and embodiments of the subject disclosure. In various exemplary embodiments, method 800 can be performed by the transport layer proxy device 200. Repetitive description of like elements employed in respective embodiments is omitted for sake of brevity.

At 802, a system comprising a processor (e.g., transport layer proxy device 200), receives (e.g., via LPT protocol component 204) first data sent for transmission to a device using a RAN device of a wireless communication network (e.g., wireless communication network 108), wherein the receiving the first data is based on a determination (e.g., made by the traffic monitoring component 202) that the first data comprises a traffic type applicable to firmware transmitted over-the-air. At 804, the system configures (e.g., via the LPT protocol component 204) the first data according to a first transport protocol, resulting in configured data, wherein the first transport protocol enables control of a rate of transmission, by the radio access network device, of data packets comprising the first data to be determined based on a current amount of bandwidth of the radio access network device that is not allocated for transmission, by the radio access network device, of second data using a second transport protocol different than the first transport protocol. At 806, the system directs (e.g., via LPT protocol component 204) the RAN device to transmit the configured data to the device using the first transport protocol.

Figure 9:
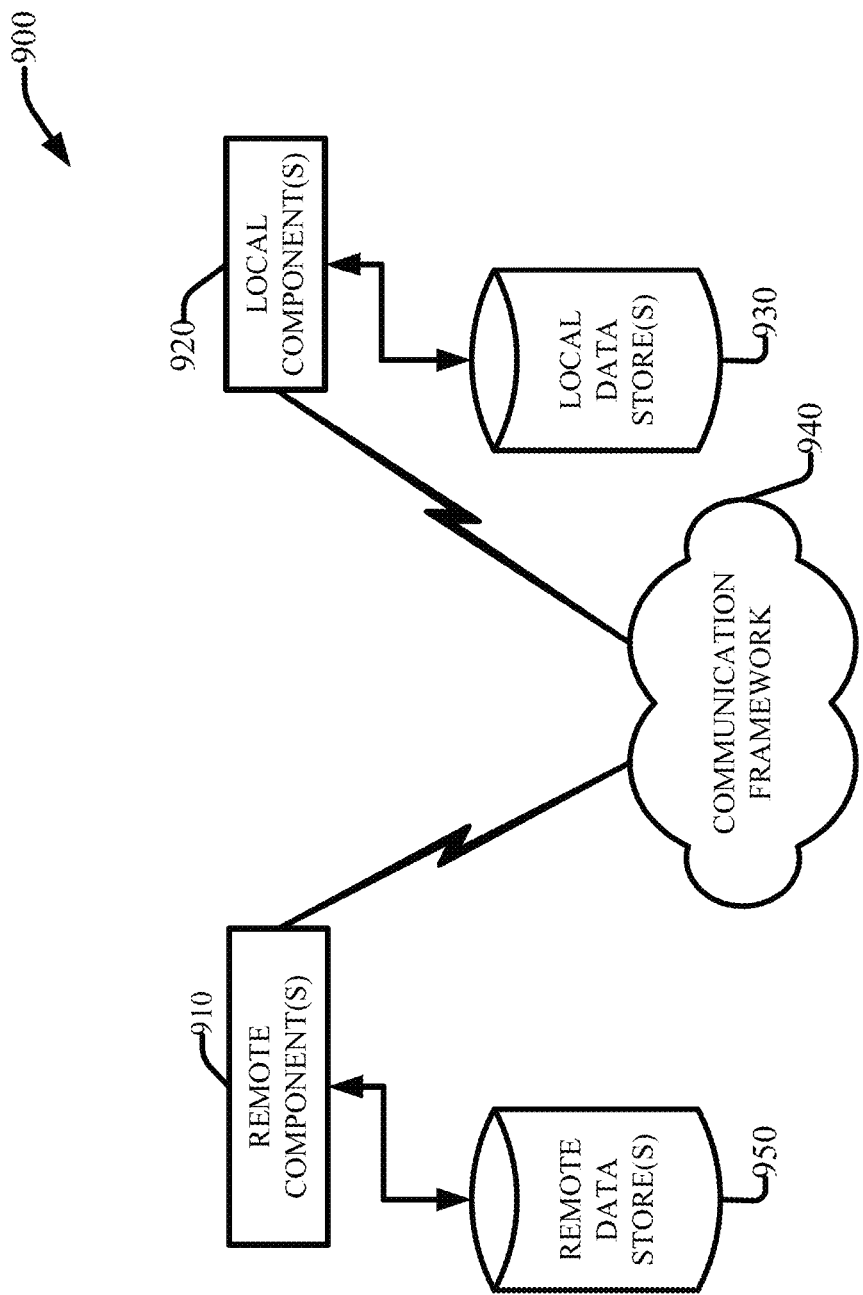
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, RAN device(s), etc. As an example, remote component(s) 910 can be network node 104, RAN device 410, network core 110, cellular network core 408, one or more network devices 112, transport layer proxy device 200, components of the transport layer proxy device, IoT packet core 406, CDN 404, and the like.

The system 900 also comprises one or more local component(s) 920. The local component(s) 920 can be hardware and/or software (e.g., threads, processes, computing devices). In some embodiments, local component(s) 920 can comprise, for example, UE 102, network node 104, RAN device 410, IoT packet core 406, CDN 404 and car management server device 402, and the like.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via an LTE network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
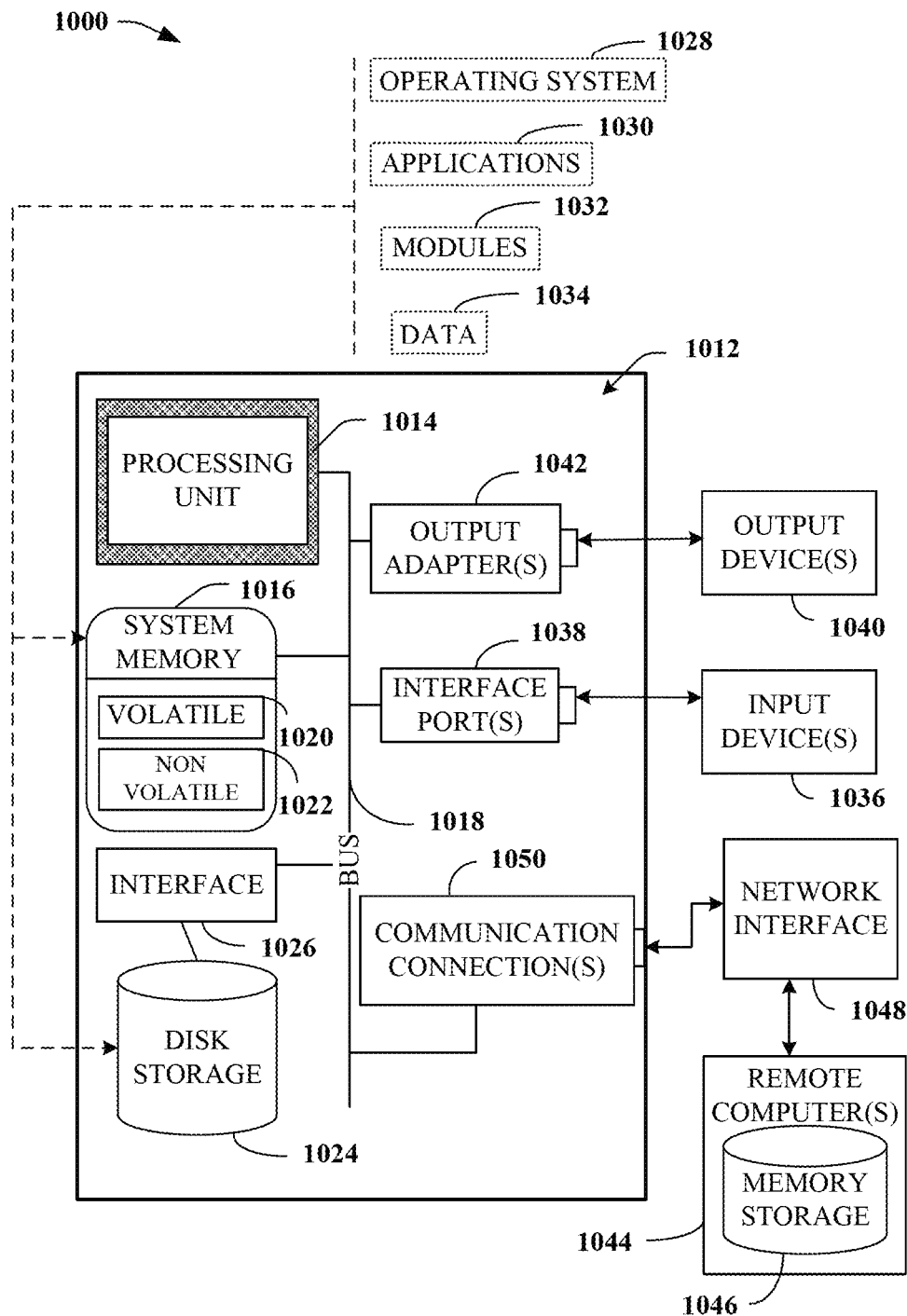
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, a UE (e.g., UE 102), a network node (e.g., network node 104), a network device (e.g., one or more network devices 112, transport layer proxy device 200, etc.), an external device (e.g., UE management server device 114), and the like. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 10104), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   intercepting data, carried on a backhaul communication link, directed for transmission to a device via a wireless connection established with the device;
   determining whether the data comprises firmware comprising determining whether a source domain name associated with the data is indicative of the data comprising firmware; and
   in response to determining that the data comprises firmware:
      determining whether the firmware comprises first firmware with a first priority that is lower than a defined priority or second firmware with a second priority that is not lower than the defined priority,
      in response to determining that the data comprises the first firmware with the first priority that is lower than the defined priority, transmitting the data to the device according to a low priority transport protocol, wherein the low priority transport protocol controls a rate of the transmission of the data based on a current amount of bandwidth of the wireless connection that is not being employed for a higher priority transport protocol assigned a higher priority than the low priority transport protocol, and
      in response to determining that the data comprises the second firmware with the second priority that is not lower than the defined priority, transmitting the data to the device according to the higher priority transport protocol, wherein the higher priority transport protocol employs a fair sharing protocol for the bandwidth of the wireless connection.

2. The system of claim 1, wherein the low priority transport protocol is a low extra delay background transport protocol.

3. The system of claim 1, wherein the higher priority transport protocol comprises a standard priority transport protocol.

4. The system of claim 1, wherein the low priority transport protocol decreases the rate of the transmission of the data as the current amount of bandwidth decreases.

5. The system of claim 1, wherein the low priority transport increases the rate of the transmission of the data as the current amount of bandwidth increases.

6. The system of claim 1, wherein the operations further comprise detecting the current amount of bandwidth of the wireless connection that is not being employed for the higher priority transport protocol.

7. The system of claim 1, wherein the first priority being lower than the defined priority comprises a type of traffic being of a traffic priority that is lower than a defined traffic priority, and wherein the determination that the data comprises the first firmware is based on the type of traffic being a type associated with the first firmware being sent over-the-air.

8. A method, comprising:
   intercepting, by network equipment comprising a processor, data on a backhaul communication link directed for transmission to a device via a wireless connection established with the device;
   determining whether the data comprises firmware based on characteristics of the data and a proxy auto-configuration file that associates defined data traffic characteristics to firmware; and
   in response to determining that the data comprises firmware:
      determining whether the firmware comprises first firmware with a first priority that is lower than a defined priority or second firmware with a second priority that is not lower than the defined priority,
      in response to determining that the data comprises the first firmware with the first priority that is lower than the defined priority, transmitting, by the network equipment, the data to the device according to a low priority transport protocol, wherein the low priority transport protocol controls a rate of the transmission of the data based on a current amount of bandwidth of the wireless connection that is not being employed for a higher priority transport protocol with a higher priority than the low priority transport protocol, and
      in response to the determining that the data comprises the second firmware with the second priority that is not lower than the defined priority, transmitting, by the network equipment, the data to the device according to the higher priority transport protocol, wherein the higher priority transport protocol employs a fair sharing protocol for the bandwidth of the wireless connection.

9. The method of claim 8, wherein the low priority transport protocol is a low extra delay background transport protocol.

10. The method of claim 8, wherein the higher priority transport protocol comprises a standard priority transport protocol.

11. The method of claim 8, wherein the low priority transport protocol decreases the rate of the transmission of the data as the current amount of bandwidth decreases.

12. The method of claim 8, wherein the low priority transport protocol increases the rate of the transmission of the data as the current amount of bandwidth increases.

13. The method of claim 8, wherein the operations further comprise detecting the current amount of bandwidth of the wireless connection that is not being employed for the higher priority transport protocol.

14. The method of claim 8, wherein the first priority being lower than the defined priority comprises a type of traffic being of a traffic priority that is lower than a defined traffic priority, and wherein the determination that the data comprises the first firmware is based on the type of traffic being a type associated with the firmware being sent over-the-air.

15. A non-transitory machine-readable medium, comprising executable instructions that, when executed by a processor, facilitate performance of operations, comprising:

intercepting data on a backhaul communication link directed for transmission to a device via a wireless connection established with the device;

determining whether the data comprises firmware comprising determining whether a cellular access point name associated with the data is indicative of the data comprising firmware; and in response to determining that the data comprises firmware:

determining whether the firmware comprises first firmware with a first priority that is lower than a defined priority or second firmware with a second priority that is not lower than the defined priority, in response to determining that the data comprises the first firmware with the first priority that is lower than the defined priority, transmitting the data to the device according to a low priority transport protocol, wherein the low priority transport protocol controls a rate of the transmission of the data based on a current amount of available bandwidth of the wireless connection that is not being employed for a higher priority transport protocol, the higher priority transport protocol being assigned a higher priority than the low priority transport protocol, and in response to determining that the data comprises the second firmware with the second priority that is higher than the defined priority, transmitting the data to the device according to the higher priority transport protocol, wherein the higher priority transport protocol employs a fair sharing protocol for a bandwidth of the wireless connection.

16. The non-transitory machine-readable medium of claim 15, wherein the low priority transport protocol is a low extra delay background transport protocol.

17. The non-transitory machine-readable medium of claim 15, wherein the higher priority transport protocol comprises a standard priority transport protocol.

18. The non-transitory machine-readable medium of claim 15, wherein the low priority transport protocol decreases the rate of the transmission of the data as the current amount of available bandwidth decreases.

19. The non-transitory machine-readable medium of claim 15, wherein the low priority transport protocol increases the rate of the transmission of the data as the current amount of available bandwidth increases.

20. The non-transitory machine-readable medium of claim 15, wherein the operations further comprise detecting the current amount of available bandwidth of the wireless connection that is not being employed for the higher priority transport protocol.

* * * * *